UNITED STATES PATENT OFFICE.

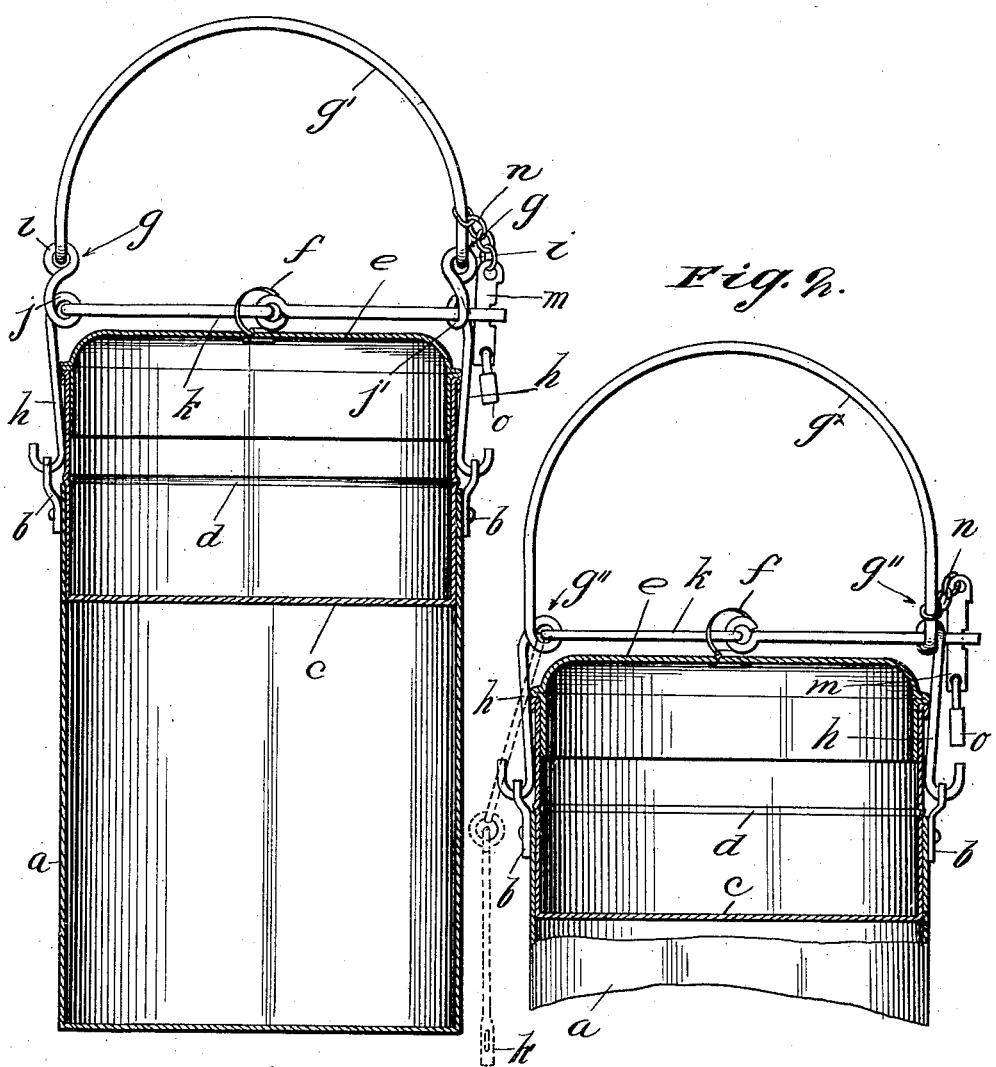

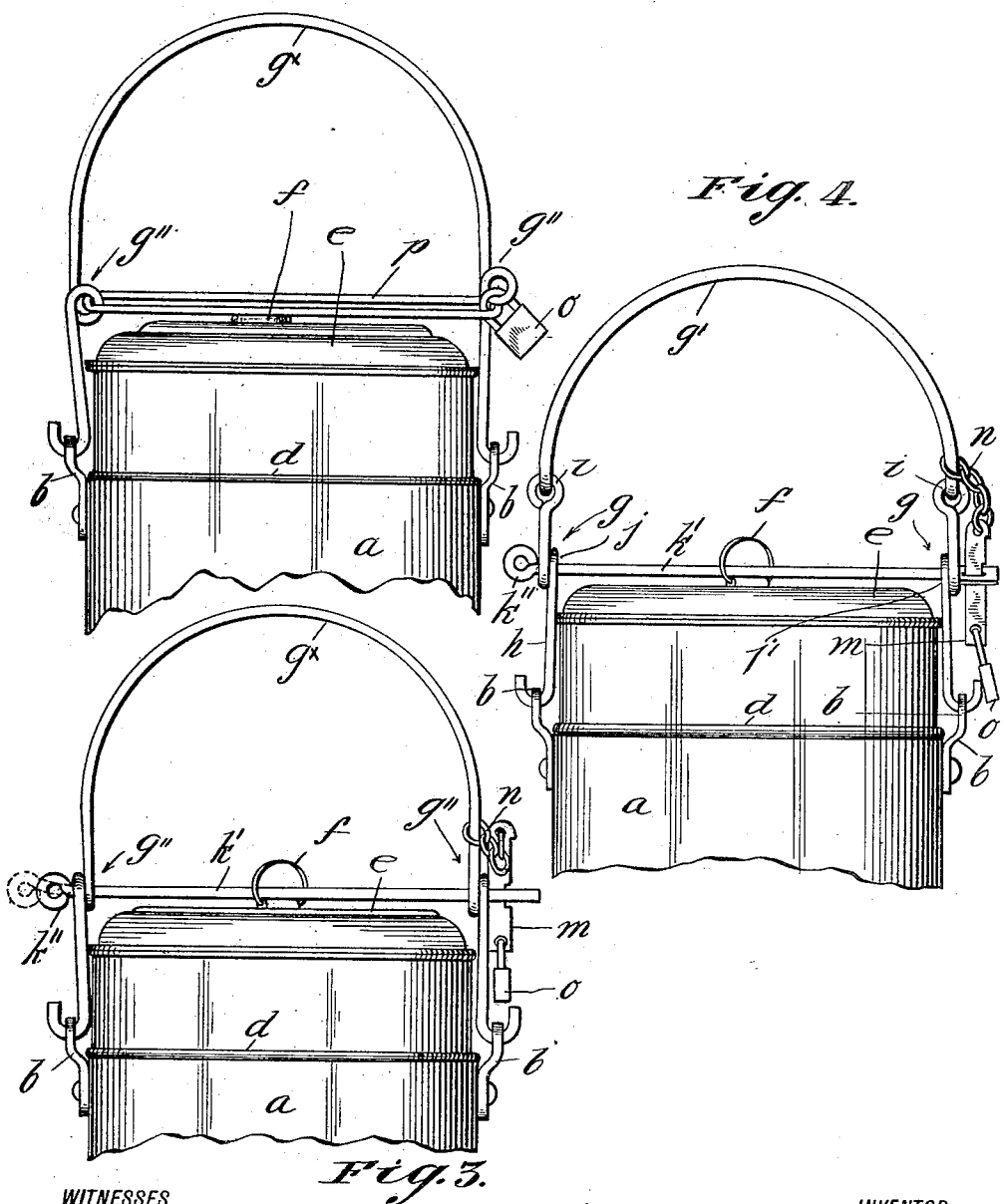

JOHN THOMAS ARTHUR PELLOW, OF LAURIUM, MICHIGAN.

PAIL.

1,131,731.  Specification of Letters Patent.  Patented Mar. 16, 1915.

Application filed August 21, 1912. Serial No. 716,133.

*To all whom it may concern:*

Be it known that I, JOHN THOMAS ARTHUR PELLOW, a citizen of the United States of America, residing at Laurium, in the county of Houghton and State of Michigan, have invented certain new and useful Improvements in Pails, of which the following is a specification, reference being had to the accompanying drawings.

This invention relates to improvements in receptacles and particularly to improvements in covered receptacles, such as dinner pails, cooking vessels and the like; and an object of this invention is the provision in such a covered receptacle of means for securing the cover in place against accidental displacement, while permitting the cover to be readily removed at will, when it is desired to obtain access to the contents of the receptacle.

Another object of this invention is the provision in a receptacle of the type just referred to of cover-locking means which will be independent of the particular form of the receptacle itself and which may be used with a variety of forms of covered receptacles and of which, therefore, the field of usefulness will be wide.

A third object of this invention is the provision in a covered receptacle of combined carrying and cover-locking means which will be simple in construction, comparatively cheap in manufacture and efficient, reliable, convenient and durable in operation and use.

A further object of this invention is to provide in a covered receptacle combined carrying and cover-locking means which may be used repeatedly, although the receptacle proper perish in its first use.

In the drawings illustrating the principle of this invention and the best mode now known to me of applying that principle, Figure 1 is a central vertical section of a dinner bucket embodying this invention; and Figs. 2, 3, 4 and 5 are fragmentary views illustrative of modified forms of this invention hereinafter referred to and described.

Referring to the drawings which form part hereof and in which similar reference characters are used to designate corresponding parts throughout the several views, $a$ is the body of the pail and is provided near its top with a pair of bail-ears $b$. Into the top of the body of the receptacle is removably fitted a box-like receptacle $c$ formed with a bead $d$ which rests upon the upper edge or mouth portion of the body $a$. The box $c$ is provided with a cover $e$ having a centrally-disposed pull-ring $f$. The dinner-pail so far described is of known form and no invention is deemed to reside therein.

Referring particularly to Fig. 1, the bail $g$ is jointed and provided at its ends with hooks $h$ each of which detachably engages a bail-ear $b$ and is formed in its upper end with an eye $i$ in which the curved handle-bar $g'$ is hingedly or jointedly mounted. The shank of each of the hook-members $h$ is looped or bent upon itself to form an eye $j, j'$ below the eye $i$; and to one of these eyes $j$ there is hingedly connected one end of a jointed locking cross-bar $k$ the other end of which in its locking position passes through and projects slightly beyond the eye $j'$ of the opposite hook. Further, in this position of the transverse locking-bar $k$ it passes through the pull-ring $f$. The locking-bar $k$ is formed at its free end with a hole through which passes the locking-pin $m$ one end of which is attached by a small chain $n$ to the bail $g$. In order to prevent unauthorized access to the contents of the pail, the other end of the locking-pin $m$ may be provided with a padlock $o$ or similar locking device.

In the modified form of this invention illustrated in Fig. 2, the bail $g^x$ is formed of one rigid piece of wire having eyes $g''$. The other parts are the same as those shown in Fig. 1.

In the modified form of this invention illustrated in Fig. 3, the pail is provided with a rigid bail $g^x$ of the same kind as that shown in Fig. 2. The locking-rod $k'$ is, however, not jointed but is rigid; and it is not hingedly connected with the bail but is provided with a head $k''$ and is slipped through the eyes $j, j'$. The other parts of the structure are the same as those shown in Fig. 2.

The pail shown in Fig. 4 differs from that shown in Fig. 3 in that the bail $g$ is jointed and is similar to that used in the pail shown in Fig. 1. With this bail $g$ is used a locking-rod $k'$ similar to the corresponding member shown in Fig. 3.

In the modified form of this invention illustrated in Fig. 5, the locking-bar $p$ is in the form of an elongated loop of wire which is mounted in the eyes $g''$ and through which passes the other end portion of the bail. The bow of a padlock *o* is passed through the other eye *g″* and the other end of the locking-bar *p*.

The cover-locking means hereinbefore described will be found particularly efficient, where the pail is liable to rough usage, such as pails are liable to receive in crowded street-cars and mine cages or on ladder roads.

While the whole contrivance is exceedingly simple in construction and cheap to manufacture, yet it may be used over and over again, although the receptacle itself perishes in its first use, as often occurs in fruit packages and the like. The combined carrying and cover-locking means shown and described may be used with stew-pans and the like where it is desired to retain the lid in place, while tipping the vessel to pour off the water. If it be desired to use the pail for the ordinary purpose of carrying water or other beverage, the locking-bar need not be in place but may be readily removed. In the form shown in Figs. 1, 2 and 5, the locking-bar will then hang by the side of the bail, while in Figs. 4 and 5 the locking-rod *k′* may be readily removed to permit the use of the pail as an ordinary carrying pail. This lessens the danger of the cross-bar's becoming entangled with passing objects or the clothing of passing persons, as is liable to occur in crowded factories, particularly if the cross-bar in its releasing position remains extending crosswise between the ends of the bail. It is to be observed that the cross-bar or locking-bar is in my pail not fastened to the lid but is readily removable from interlocking engagement therewith and is, therefore, handy and convenient and susceptible of being readily put in locking position and quickly removed therefrom.

I claim:

1. A receptacle of the character described having a cover, bail-ears and a bail the end portions of which are formed with eyes and are hooked detachably into the bail-ears; and a transverse locking-bar which is cahried by the bail and extends between the end portions thereof and just above the cover; one end of said locking-bar being mounted in the eye formed in one end portion of the bail and the other end of said locking-bar being releasably interlocked with the eye in the other end portion of the bail; said locking-bar being capable of ready and entire withdrawal from above the cover, when its last-named end is released from its interlock with the last-named eye.

2. A receptacle of the character described having a cover, bail-ears and a bail the end portions of which are formed with eyes and are hooked detachably into the bail-ears; a transverse locking-bar which is carried by the bail and extends between the end portions thereof and just above the cover; one end of said locking-bar being mounted in the eye formed in one end portion of the bail and the other end of said locking-bar being releasably interlocked with the eye in the other end portion of the bail; and means for detachably fastening the last-named end of said locking bar in interlocked relation with the last-named eye; said locking-bar being capable of ready and entire withdrawal from above the cover, when its last-named end is released from its interlock with the last-named eye.

3. A receptacle of the character described, including a body portion having bail-ears and a bail the end portions of which are formed with eyes and are hooked into the bail-ears; a box removably mounted in said body portion and provided with a cover; and a transverse locking-bar which is carried by the bail and extends between the end portions thereof and just above the cover and locks said box in said body portion; one end of said locking-bar being mounted in the eye formed in one end portion of the bail and the other end of said locking-bar being releasably interlocked with the eye in the other end portion of the bail; said locking-bar being capable of ready and entire withdrawal from above the cover, when its last-named end is released from its interlock with the last-named eye.

Signed at Laurium, Michigan, this sixth day of July, A. D., 1912, in the presence of the two undersigned witnesses.

JOHN THOMAS ARTHUR PELLOW.

Witnesses:
 JOHN D. KERR,
 ELMER P. LARSON.

Copies of this patent may be obtained for five cents each, by addressing the "Commissioner of Patents, Washington, D. C."